US008019714B2

(12) United States Patent
Zhang

(10) Patent No.: US 8,019,714 B2
(45) Date of Patent: *Sep. 13, 2011

(54) THINKING SYSTEM AND METHOD

(76) Inventor: Qin Zhang, Los Angeles, CA (US)

( * ) Notice: Subject to any disclaimer, the term of this patent is extended or adjusted under 35 U.S.C. 154(b) by 1154 days.

This patent is subject to a terminal disclaimer.

(21) Appl. No.: 11/409,460

(22) Filed: Apr. 22, 2006

(65) Prior Publication Data

US 2007/0156623 A1 Jul. 5, 2007

Related U.S. Application Data

(60) Provisional application No. 60/749,808, filed on Dec. 12, 2005.

(51) Int. Cl.
*G06F 17/00* (2006.01)
*G06N 5/02* (2006.01)

(52) U.S. Cl. ......................................................... 706/48
(58) Field of Classification Search ...................... 706/48
See application file for complete search history.

(56) References Cited

U.S. PATENT DOCUMENTS

| | | | | |
|---|---|---|---|---|
| 5,321,608 A | * | 6/1994 | Namba et al. | 704/9 |
| 5,594,837 A | * | 1/1997 | Noyes | 706/55 |
| 5,677,835 A | * | 10/1997 | Carbonell et al. | 704/8 |
| 5,787,426 A | * | 7/1998 | Koshiba et al. | 707/7 |
| 5,794,050 A | * | 8/1998 | Dahlgren et al. | 717/144 |
| 6,810,376 B1 | * | 10/2004 | Guan et al. | 704/9 |
| 2004/0073874 A1 | * | 4/2004 | Poibeau et al. | 715/531 |
| 2005/0071150 A1 | * | 3/2005 | Nasypny | 704/9 |

OTHER PUBLICATIONS

Trehub, Arnold. "The Cognitive Brain Chapter 6: Building a Semantic Network" Cambridtge, MA. US. The MIT Press 1991. p. 99-115.*
Nick Parlante, "Binary Trees" Jun. 27, 2001 verified by wayback machine.*

* cited by examiner

*Primary Examiner* — Omar Fernandez Rivas
*Assistant Examiner* — Ben Rifkin

(57) ABSTRACT

A thinking system and method is provided by the present invention. In the present invention, the "thinking" system is capable of accepting information from outside environment, analyzing the information, requesting additional information, and then resulting the problem. More particularly, the system can make new rules according to the information within the system and the new information received and requested. The rule making process is not controlled by outside command, but by an internal controlling mechanism that can be modified by the outside commands. Further, the system comprises a knowledge structure that can be used by the system for analyzing the inputted information, making request for additional information, making new rules, and solving problems, wherein the knowledge structure comprises element files include direct link information of the elements with other elements of the element files in the knowledge structure.

15 Claims, 5 Drawing Sheets

THINKING SYSTEM AND METHOD

CROSS REFERENCE TO RELATED APPLICATIONS

The present application claims the benefit of and incorporates in full the provisional application entitled "A Thinking System and Method" with Application No. 60/749,808 filed on Dec. 12, 2005.

FIELD OF THE INVENTION

The present invention relates generally to a method or system imitating functions of the human brain. More particular, the present invention imitates thinking process of the human brain.

BACKGROUND OF THE INVENTION

Computer technology has been developed that a computer can perform many sophisticated tasks in fast speed. However, many tasks simple to human beings cannot be performed or are difficult for the computers to perform. It is because currently the computers cannot "think".

The attempt to simulate the human thinking process is based on the computational theory of the mind. The existing methods in artificial intelligent field try to imitate the human "thinking" process by establishing a vast knowledge base and rule base. The problem is that most of the human thinking process cannot be reduced to mathematic formulas and models, and mathematic formulas and models are necessary for any automatic process driven by rules in the current technology field. The neural network was created to solve this problem by eliminating the needs for rules in the inner structure of the network. However, the neural network is based on fuzzy logic, the links between inputs and outputs are established based on the model inputs and outputs, wherein the accuracy between the inputs and outputs depends on the quality of the model inputs and outputs, the actual links are neither traceable, nor controllable. Therefore, the accuracy of the actual output cannot be guaranteed or even predicted. Obviously, neural network is not a true imitation of the human thinking process, especially in using languages. A solution is needed and long over due.

The problem in the existing knowledge and methods is mostly related to the confusion and misunderstanding or even fear or mind block about the mystery of human mind or thinking process. An example of this problem is the famous "Chinese Room" hypothetical adopted by philosopher John Searle. By this hypothetical, Searle refuted the computational theory of mind by questioning the notion of "understanding" by illustrating that simply knowing the link between one word with another word does not means the person understands the meaning of these words. No satisfying response was offered although the amounts of responses are impressive.

The confusion about "understanding" explained lack of progress in artificial intelligent filed. The founder of the computational theory of the mind, Hilary Putnam, had revised his opinion on this theory significantly. The computational theory of mind believed that the continuous linking process propagated from one set of symbols to other symbols would be a thinking process, in essence not fundamentally different from the ordinary mathematic computation process. But a word symbol must have meaning, and computational theory of mind cannot provide a computer usable representation of the meaning of the word symbol. At this point, attempts had been diverted to various directions (for example, Putnam had engaged himself in a discussion about truthfulness of a representation, which does not directly related to the meaning of word symbols or thinking processes, because the meaning of word symbols and thinking processes would be presumed to be true, and false meanings or thinking processes would simply be removed if discovered later on.)

The computational theory of mind also encountered difficulties in realization of the continuous linking processes between word symbols in computers. The linguistic analysis by Noam Chomsky regarding the sentence structures revealed the complicity and variety of the sentence structures, and is not successful for establishing linking processes between word symbols in general sense. Chomsky studied the sentence structures in the attempt to find innate structure of the languages, but not computer model base on his theory can reconstruct languages successfully.

SUMMARY OF THE INVENTION

Based on the forgoing, a new method and system for imitating the human "thinking" process is provided.

One of the underlining ideas of the present invention could be a direct response about the "Chinese Room" confusion. According to the present invention, understanding of a particular word is not through a link with another word, but through all links of this particular word with other words, phrases, symbols, etc. Those other words, phrases, symbols, etc. are also linked with yet other words, phrases, symbols, etc. Human knowledge system is represented by an interconnected, multidimensional network that is constructed by the multiple links among words, phrases, symbols, etc. Therefore, there is no innate structure in the present invention. The understanding and thinking are based on links between words, phrases, and symbols according to human knowledge system. Those links are enormous and complicated, but there is no mystery. There are alternative links between words, phrases, and symbols, but any thinking process according to the present invention will provide a real life related result that is meaningful, understandable, and grammar accurate. The key is that the present invention uses human knowledge for the bases of the structure model and no additional model is needed. A system based on correct understanding and accurate reflection of the human knowledge will provide successful result.

According to the present invention, the human knowledge system basically is a system with multiple, multidimensional links between various elements, and the function of the human languages, and more specifically sentences of the human languages is to establish and express links between various elements. By treating sentences as links between elements, the variation and complexity of the sentence structures is dissolved.

The thinking system of the present invention comprises a knowledge structure, a process structure, an executing system, and a system log.

The knowledge structure comprises numerous element files and a file organizing mechanism. Each element file contains information identifying and distinguishing the element and knowledge indicating direct connections of this element with other elements. The identifying information is about whether the element is a word, a phrase, a symbol, or a graphic, etc., and for a word, what language is the word, and whether the word is a noun, a verb, a pronoun, etc. The connection information is about whether the meaning of the word is general, specific, or interchangeable with other words, the way the element is supposed to be used in sentences, the conditions and results related with the element, the attributes of the element, and other information indicating how this element is related to other elements. Further, information in the element files will tell executing system to how to act in respond to the information. Preferably, each element file comprises an identification file, and a link file. The file organizing mechanism provides ways for the element files to be easily located by the executing system. The file name of the element file could be the name of the element. The element files could be arranged according to the alphabetical order of the elements, and the element files could be located alphabetically by the executing system according to the organizing mechanism.

The executing system can take information, read information, think about the information, write answers, output answers and give commands to activate other devices, memorize changes to the element files and new processes, verify changes and new processes, and update system commands or setup. The executing system comprises internal control mechanism contains internal control rules that are instructions so that not only it will be in action in respond to the input, but also will be in action according to the internal setup or instructions of the executing system. The internal control mechanism also includes structure rules containing sentence structure information for analyzing and reconstruct sentences. The structure rules can also contain logic structure information for making decisions in linking processes.

The executing system can take input and convert it into readable format, then read the information, i.e., each element of the input will be identified by searching and locating the element file that matches this element. The element files will be loaded to a location easily accessible by the executing system. Then the executing system will start thinking mode by looking into the element files and find out whether the element is a noun, a verb, a pronoun, a symbol, etc. This information of the words in the sentence will be matched with standard sentence structures according to the structure rules in the executing system. The executing system may contain special internal control rules that correspond to special inputs as commands for special action routines that designate the sequences of the internal control mechanism. If no specific action routine is setup, any match of the specific sentence structure will trigger a preset action routine. For a statement sentence, new links of the words will be established by the statement. For a question sentence, a sequence of actions will be taken to perform the task to find answers for the question. For a command sentence, actions will be taken to follow the command. Actions taken by the executing system will require further reading of the element files in the sentences. The sequence of actions that lead to successfully perform the task will be saved as a process file, identified by initial input and the task request. The process files belong to the process structure, acted as the rule base for the executing system. Preferably, any actions taken by the executing system will be simultaneously saved in the system log, identified by critical elements, time of actions, etc. Preferably, the executing system of the present invention will also be able to imitate human logic process such as generalization, deduction, etc. to make new links and create new process files according to existing links and process files. These actions should be directed by commands provided by the executing system, rather than external inputs.

The system of the present invention is capable of making inquiries to system operator and/or database library, and/or internet resources about new elements, conditions and links. The executing system will command to make new links or make new inquiries. The executing system can also verify the established links and processes by making inquiries to confirm the links and process. Therefore, the system of the present invention will not only respond to the inputting commands, but also generating its own commands according to the executing system set up, knowledge structure and process structure, and sometimes system log. The executing system of the present invention should be able to accept new commands and process routines from input convert them into internal set up.

BRIEF DESCRIPTION OF THE DRAWINGS

The above and further features and advantages of the present invention may be appreciated from the detailed description of preferred embodiments with reference to the accompanying drawings, in which.

DETAILED DESCRIPTION OF THE INVENTION

Figure 1:
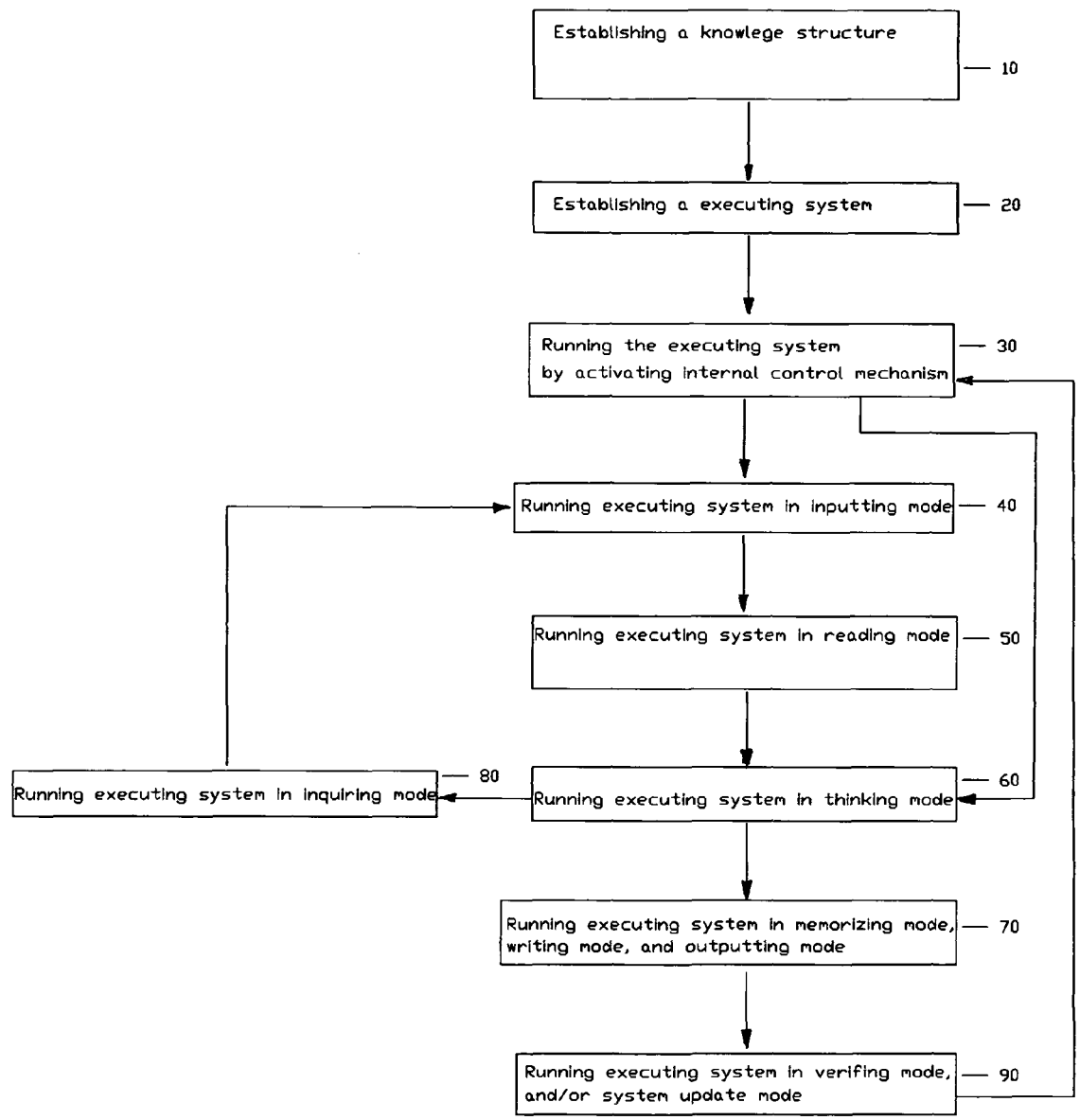
FIG. 1 is a schematic illustration of one preferred embodiment of the method of the present invention.

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

A close look of the human "rule making" process indicates that most of the rules are simply direct or indirect links between the given conditions and the end results. Any task is provided with a given condition, and demands a desirable end result. The human learning process is to establish the link between given condition and end result by "try and error", direct rule making, reference, induction, and deduction, etc. The sophisticated thinking process usually involves a skilled combination of various rules to establish the connection between the given condition and the end result.

Therefore, the key to accomplish various tasks is to obtain as many useful rules as possible and to successfully combine the rules. The purpose of the present invention is to provide a method and system to obtain useful rules and successfully combine the rules.

A basic consideration of the present invention is that in general the human knowledge system is not a liner system as in basic mathematic system. The complication of the human thinking process derived at least partially from the existence of multiple elements where the relationship between them cannot be quantified in simple dimensions. Therefore, one aspect of the present invention is to establish a knowledge structure that can best capture the essence of the human knowledge system yet provide fundamental basis for workable rule making. The goal is to find fundamental relationships between each element of the knowledge system so that links between some elements of the knowledge structure can be applied to other elements. This goal is accomplished with the helps of generalization, among others. In studying the human knowledge system as manifested in various languages, it is apparent that some elements (words or phrases) are more general in meaning. Therefore, some elements (words or phrases) can be replaced by other elements (words or phrases) in sentences. This is one of the bases for knowledge structure of the thinking system of the present invention.

Since the links between knowledge elements are multi-dimensional, the knowledge structure is established to reflect this characteristic. Every element of the knowledge structure is provided with an element file containing all the information of the element for establishing links. Basically, the information of the element file is information related to links of this element with multiple other elements. Therefore, a link between two elements will be reflected in both of the element files.

The executing system of the present invention contains and executes the commands and action procedures of the system. The executing system of the present invention will respond to the link information of the element files of the knowledge structure and take action according to the link information. One special feature of the executing system that reflects the novelty of the present invention is the active acquisition of knowledge. It will also be able to establish and expend the links between elements. It will also be able to create rules according to existing information, and save these rules in process files. New information will be used to create new links and rules, and the executing process will be saved simultaneously in a system log as log files. These processes are similar to the human memorizing processes. Basically, the system of the present invention not just responds to commands and inputs as in existing AI system, it will also generate commands and acquire inputs. The process is dynamic, self-driven, as in human thinking process.

The difference between the present invention and the existing system and method is that the present invention intends to establish multiple links between any elements of the knowledge structure. With the knowledge structure contains these links, the relative relations within these elements are established. Therefore, any given elements will lead to other elements by invoking these links, so the system of the present invention will be able to understand the meaning of each elements and in turn the meaning of each sentences and so on.

A word or phrase can be defined by meaning and function. To give a meaning to a word, two steps are needed. First, divide the words into groups; second, establish relationship of the words within the group. The relationships of the words within the group includes nonrestricted unconditional equal (exchangeable), restricted unconditional equal, nonrestricted conditional equal, restricted conditional equal, one way equal, one way inclusive, partially common inclusive, word of opposite meanings, possessive, etc. Restricted equal means the word has different meanings, and in one meaning the word will be equal to another word. To define the word by function is to establish relationships between words in different groups. This is usually indicated by functions of the word in the sentences, and is defined by the structure of the sentence. A phrase usually equals in meaning and function with a word. It can be treated as a word in most situations.

A preferred embodiment of the present invention divides words into noun, verb, pronounce, adjective, etc. Every word has an element file with identification file or field indicating which group this word belongs to (there might be more that one group indication, with related condition and need verification). The element file of a word also includes link fields or link files contain links with other words, symbols, graphics, etc. including restrictions, conditions, and other related parameters. For the link information related to the function of the word, the element file will include information regarding how the word interact with other words and is situated in sentences, and what this word will respond to or will trigger the action from. The element file can also contain information about the words that cannot be associated together as an exemption of the general rule. The element file can also contain information about grammar changes of one word as a response to another word. The element file of the word can include information fields or information files indicating various attributes of the word. Related to the function definition, the sentence structure in the structure rules of the executing system further established the relationship between words. Various possible sentence structures can be provided as alternative default setting of the sentence. These sentence structure information can be used for writing a sentence, getting information from inputted sentences, etc. In general, sentences provide link information between words under certainly conditions.

The first important step of establishing knowledge structure is to input information about words, phrase, symbols etc. in element file format either by human input or system automatic process. In general, the initial knowledge structure will be established by human operators. As the thinking system of the present invention become more complete and sophisticated, the knowledge structure can be expended with little human assistance, most likely just to verify the result by humans. When element files for most of the common words and phrases are established, a new element file can be established by dictionary definition, then the executing system of the present invention can expend the element file to fill in most of the information in this element file according to element files for the words in the definition.

For example, establishing the knowledge structure can start with establishing element files for commonly used words. The basic idea of the knowledge structure is to establish connections between words, phrases or symbols. As part of the structure, words are divided into different groups, such as verb, noun, pronoun, adjective, adverb, etc. In a preferred embodiment, each word, phrase or symbol has an element file comprises identification, attribute and link information related to the word, phrase or symbol.

An element file for a specific word may include information indicating whether it is a word, a phrase, or a symbol; what language it is; whether it is a verb, noun, or pronoun, etc.; the class and form of the word; information indicating other words that are more general in meaning, less general in meaning, or similar in meaning; sentence format related to the word; and information related to causes and result of the occurrence related to the word; attributes of the word; and other information. Preferably, the link between two words is indicated in the both element file for each word.

In this application, English is the language for the knowledge system. The knowledge system for other language will be similar with some variations. In studying English, we can find that nouns may name a person, a thing, a place, time, a quality, or an idea, and it can be defined by the relationship with other nouns. For example, a specific city can be defined by the state and country, the distances with other cities, geographic location and dimensions, its population, weather, economy, attractions, and so on. The content of this information can be in plain text, or in predefined fields.

In general, words may represent entities, actions, status, or other states of existence. Nouns are used for representing entities, verbs are used for representing actions of entities.

The nouns can be divided into classes including common nouns, proper nouns, collective nouns, count nouns, mass nouns, concrete nouns, abstract nouns. The common nouns refer to general classes, ex. book, government, music. Proper nouns name specific people or places, ex. Susan, Athens, Candlestick Park. Collective nouns name groups, ex. team, class, jury, family. Count nouns name things that can be counted, ex. ounce, camera, pencil, person, cat. Mass nouns name things that are not normally counted, ex. jewelry, milk, music, information. Concrete nouns name tangible things, ex. ink, porch, bird. Abstract nouns name ideas or qualities, ex. quality, greed, capitalism.

Nouns have forms in subjective and objective case, possessive case, and plural. The subjective and objective case is the general form of a noun. Possessive case is shown by the use of the apostrophe or by a "of" construction.

The element files for verbs may contain different information than that of nouns. Verbs express an action (bring, change, grow), an occurrence (become, happen), or a state of being (be, seem). Verbs can be divided into classes as transitive, intransitive, linking verbs, and auxiliary verbs.

A verb is intransitive when the context does not require an object to complete its meaning. Most verbs are intransitive. A verb is transitive when the context requires an object to complete its meaning. The linking verb links subject and object. Linking verbs indicate a state of being or a condition.

Auxiliary verbs are forms of the verbs be, do, have, and others. Auxiliary verbs combine with main verbs to make verb phrases. The verbs can, could, may, might, must, shall, should, will, and would are modal auxiliary verbs. Modal auxiliaries work in concert with the simple form of main verbs to communicate a meaning of ability, permission, obligation, advisability, necessity, or possibility.

All verbs except "be" have five basic forms. The first three forms—simple, past tense, and past participle—are the verb's principal parts. The simple form is the form when the verb's action occurs in the present and the subject is a plural noun or the pronoun I, we, you, or they. The past-tense form indicates that the verb's action occurred in the past. If it is a regular verb, it formed by adding -d or -d to the infinitive. For some irregular verbs, the past-tense forms are not formed by regular way. The past participle in regular verbs uses the same form as the past tense. In irregular verbs, the forms for the past tense and the past participle usually differ. A past participle can combine with an auxiliary verb in a verb phrase. Past participles combine with auxiliary verbs to form perfect tenses and passive-voice verbs. Used alone, a past participle functions as an adjective. Verbs also have a present participle. It is formed by adding -ing to the simple form. To function as a verb, the present participle must combine with an auxiliary verb in a verb phrase. Used alone, present particles function as adjectives or nouns. When a present participle functions as a noun, it is called a gerund. The -s form of a verb occurs in the third-person singular in the present tense. The -s ending is added to a verb's simple form. The verbs "be" and "have" are irregular verbs. For the third-person singular, present tense, "be" uses "is" and "have" uses "has".

Verbs use tense to express time. The three simple tenses divide time into present, past and future. Three perfect tenses also divided into present, past and future. The three simple tense and the three perfect tenses also have progressive forms. These forms show an ongoing or a continuing dimension to whatever the verb describes.

Mood refers to the ability of verbs to convey a writer's attitude toward a statement. The indicative mood is used for statements about real things, or highly likely ones, and for questions about fact. The imperative mood expresses commands and direct requests. The subjunctive mood expresses conditions including wishes, recommendations, indirect requests, and speculations.

Voice refers to verbs' ability to show whether a subject acts or receives the action named by the verb. English has two voices: active and passive. In the active voice, the subject performs the action. In the passive voice, the subject is acted upon, and the person or thing doing the acting often appears as the object of the preposition by. Verbs in the passive voice add forms of "be" and "have", as well as "will", as auxiliaries to the past participle of the main verb.

Most pronouns substitute for nouns and function in sentences as nouns do. Pronouns fall into several classes depending on their form or function. Personal pronouns refer to a specific individual or to individuals. They are I, you, he, she, it, we, and they. Indefinite pronouns, such as "everybody" and "some", do not substitute for any specific nouns, though they function as nouns. Demonstrative pronouns, including this, that, and such, identify or point to nouns. The relative pronouns who, which, and that relate groups of words to nouns or other pronouns. Intensive and reflexive pronouns have different functions but the same form: a personal pronoun plus -self. Intensive pronouns emphasize a noun or other pronoun. Reflexive pronouns indicate that the sentence subject also receives the action of the verb. Finally, interrogative pronouns, including who, which, and what, introduce questions.

The personal pronouns "I, he, she, we, and they" and the relative pronoun "who" change form depending on their function in the sentence.

Pronouns have forms of subjective, objective, possessive. Subjective form is used when a pronoun is the subject of sentence, the subject of a clause, the complement of a subject, or an appositive identifying a subject. The objective form is used when a pronoun is the direct or indirect object of a verb or verbal, the object of a preposition, the subject of an infinitive, or an appositive identifying an object. The possessive form of a pronoun is used before nouns and gerunds. The possessive forms mine, ours, yours, his, hers, and theirs may be used without a following noun, in the position of a noun.

Adjectives describe or modify nouns and pronouns, or word groups used as nouns, and can be divided into classes. Descriptive adjective name some quality of the nouns. Limiting adjectives narrow the scope of a noun. They include possessives, words that show number, demonstrative adjectives, interrogative adjectives, and numbers. Proper adjectives are derived from proper nouns. Attributive adjectives appear next to the nouns they modify. Predicate adjectives are connected to their nouns by linking verbs. It can be divided into three forms distinguished by degree: a positive degree, such as good, green, angry, badly, quickly, angrily; the comparative form, such as better, greener, angrier, worse, more quickly, more angrily; the superlative form, such as best, greenest, angriest, worst, most quickly, most angrily.

Adverbs describe the actions of verbs and also modify adjective, other adverbs, and whole groups of words, or sentences. Adverbs can be divided into classes of modifiers of verbs, adjectives and other adverbs; sentence modifiers; conjunctive adverbs. Adverbs also have three forms: positive, comparative, and superlative.

Prepositions are connecting words. A proposition always connects a noun, a pronoun, or a word group functioning as a noun to another word in the sentence. The noun, pronoun, or word group so connected is the object of the preposition. The preposition plus its object and any modifiers is a prepositional phrase. Prepositions normally come before their objects. But sometimes the preposition comes after its object, particularly in speech.

Prepositional phrases usually function as adjectives or as adverbs, occasionally as nouns. The phrase must be attached to another group of words containing both a subject and a predicate. A prepositional phrase that introduces a sentence is set off with punctuation, usually a comma, unless it is short. A prepositional phrase that interrupts or concludes a sentence is not set off with punctuation when it restricts the meaning of the word or words it modifies. When an interrupting or concluding prepositional phrase does not restrict meaning, but merely adds information to the sentence, then it is set off with punctuation, usually a comma or commas.

The verbals are special verb forms such as participles, gerunds, infinitives, that can function as nouns or as modifiers. Any verbal must combine with a helping verb to serve as the predicate of a sentence. The present participle consists of the dictionary form of the verb plus the ending -ing. The past participle of the most verbs consists of the dictionary form plus -d or -ed. Some common verbs have an irregular past participle. Both present and past particles function as adjectives to modify nouns and pronouns. Gerund is the name given to the -ing form of the verb when it serves as a noun. Present participles and gerunds can be distinguished only by their function in a sentence. If the -ing form functions as an adjective, it is a present participle. If the -ing form functions as a noun, it is a gerund. The infinitive is the to form of the verb, the dictionary form preceded by the infinitive marker to. Infinitives may function as nouns, adjectives, or adverbs.

Participles, gerunds, and infinitives—like other forms of verbs—may take subjects, objects, or complements, and they may be modified by adverbs. The verbal and all the words immediately related to it make up a verbal phrase. With verbal phrases, we can create concise sentences packed with information. Like participles, participial phrases always serve as adjectives, modifying nouns or pronouns. Gerund phrases, like gerunds, always serve as nouns. Infinitive phrases may serve as nouns, adjectives, or adverbs. When an infinitive of infinitive phrase serves as a noun after verbs such as hear, let, help, make, see, and watch, the infinitive marker to is omitted (these information should be reflected in the element files of the these words). A verbal or verbal phrase serving as a modifier is almost always set off with a comma when it introduces a sentence. A modifying verbal or verbal phrase that interrupts or concludes a sentence is not set off with punctuation when it restricts the meaning of the word or words it modifies. When an interrupting or concluding verbal modifier does not restrict meaning, but merely adds information to the sentence, it is set off with punctuation, usually a comma or commas.

An appositive is a word or word group that renames the word or word group before it. The most common appositives are nouns that rename other nouns. All appositives can replace the words they refer to. Appositives are often introduced by words and phrases such as or, that is, such as, for example, and in other words. Although most appositives are nouns that rename other nouns, they may also be and rename other parts of the speech. Noun appositives are economical alternatives to adjectives to adjective clauses containing a form of "be".

Compounded words, phrases, and clauses are closely related and parallel in importance. The coordinating conjunctions and, but, nor, and nor always connect words or word groups of the same kind.

The conjunctions for and so cannot connect words, phrases, or subordinate clauses. For may also function as a preposition. When it functions as a conjunction, it indicates cause. So indicates result. The word yet often functions as an adverb, but it can also function as a coordinating conjunction. Like but, it indicates contrast.

Some conjunctions pair up with other words to form correlative conjunctions. Conjunction adverb relates only main clauses, not words, phrases, or subordinate clauses. Conjunction adverbs describe the relation of the ideas in two clauses.

A clause is any group of words that contains both a subject and a predicate. There are two kinds of clauses, and the distinction between them is important. A main or independent clause can stand alone as a sentence. A subordinate or dependent clause is just like a main clause except that it begins with a subordinating words such as because, if, who, or that express particular relationships between the clauses they introduce and the main clauses to which they are attached. Clauses that have been subordinated can never stand alone as sentences. Two kinds of subordinating words are used to connect subordinate clauses with main clauses. The first kind is subordinating conjunctions or subordinators. They always come at the beginning of subordinate clauses. Like prepositions, subordinating conjunctions are few and never change form in any way. The second kind of connecting word is the relative pronoun. It also introduces a subordinate clause and links it with an independent clause. Like subordinating conjunctions, relative pronouns link one clause with another. But unlike subordinating conjunctions, relative pronouns also usually act as subjects or objects in their own clauses, and two of them change form accordingly. Subordinate clauses function as adjectives, adverbs, and nouns.

The system and method of the present invention provides rule generating process. The input, output, and executing process are saved as process files with specific identifying means. The system and method of the present invention may automatically inquiry new information according to internal commands, and knowledge structure.

As seen in FIG. 1, the method of the present invention comprises the steps of:

Step 10: establishing a knowledge structure including a file organizing mechanism, and more than one element files, wherein the element files including identifying information and knowledge information;

wherein the wherein the identifying information identifies the element, wherein the knowledge information includes knowledge about the element, wherein the knowledge is information related to at least one direct links of the element with other elements of the knowledge structure;

establishing a process structure comprising a process file organizing mechanism, and at least one process file;

Step 20: establishing an executing system comprising an internal control mechanism and an inputting mode, a reading mode, a thinking mode, a writing mode, a memorizing mode, an outputting mode, an inquiry mode, verification mode, and a system update mode;

Establishing a system log;

wherein the inputting mode includes inputting rules, wherein the reading mode includes reading rules, wherein the thinking mode includes thinking rules, wherein the writing mode includes writing rules, wherein the memorizing mode includes memorizing rules, wherein the outputting mode includes outputting rules, wherein the inquiry mode includes inquiring rules, wherein the verification mode includes verification rules; wherein the system update mode includes system update rules;

wherein the internal control mechanism includes internal control rules, and structure rules;

Step 30: running the executing system wherein the internal control mechanism can operate constantly, wherein the thinking mode, inquiry mode, memorizing mode, verification mode, and a system update mode can be activated according to the internal control rules of the internal control mechanism not triggered by an input;

wherein according to the thinking rule, direct link between a first existing element and a second existing element can be used to establish new direct links between the first existing element and at least one existing element with direct link with the second existing element;

wherein according to the thinking rule, process files can be used to establish new direct links between the existing elements;

Step 40 if input information is to be received from an inputting device, the internal control mechanism will operate inputting mode according to the internal control rules, wherein the input information will be converted to format conformed with the format requirement by the executing system according to the inputting rules, wherein information other than language may be converted to language information;

Step 50 once input information is received by the executing system, the internal control mechanism will activate reading mode according to the internal control rules, wherein according to the reading rules, the input will be disseminated into elements and element files of the knowledge structure with corresponding elements matched with the input elements will be located and loaded into the executing system (or areas easily accessible by executing system) according to the file organizing mechanism of the knowledge structure;

wherein when the input information is in language format, the reading mode will read the identifying information of the element files of each of the input elements according to the reading rules, wherein the structure rules of the internal control mechanism will determine sentence structure of the input to decide what kind of task the input is calling for, and determine corresponding internal control rules for operating the internal control mechanism;

wherein when the input information is a task command with specific format, it may directly trigger the structure rule of the internal control mechanism to determine corresponding internal control rules for operating the internal control mechanism;

Step 60 if it is determined a specific task is called for, the internal control mechanism will activate the thinking mode, wherein according to the thinking rules designated by the internal control mechanism, the thinking mode can establish new direct links between the existing elements of the knowledge structure that match with the elements of the input information according to the input information;

wherein the existing direct links between the existing elements that match with the elements of the input information and other existing elements of the knowledge structure in each of the said existing element file can be used to further provide new direct links between the existing elements that match with the elements of the input information and more other existing elements in the knowledge structure, the linking processes of the elements related to the input information with other elements in the knowledge structure can continue according to the direct links of the elements with other elements according to the element files of the elements, and update element files for elements linked with the input information;

wherein when the task calls for establishing a direct link between a first existing element and a second existing element, the direct links of the first existing element with other existing elements in the knowledge structure according to the element file of said first existing element will lead to the element files of said other existing elements that link with the first existing element, the direct links of said other existing elements that link with the first existing element with more other existing elements in the knowledge structure according to the element files of said other existing elements that link with the first existing element will lead to the element files of said more other existing elements that link with the first existing element, wherein the direct links of the second existing element with other existing elements in the knowledge structure according to the element file of said second existing element will lead to the element files of said other existing elements that link with the second existing element, the direct links of said other existing elements that link with the second existing element with more other existing elements in the knowledge structure according to the element files of said other existing elements that link with the second existing element will lead to the element files of said more other existing elements that link with the second existing element, wherein the linking process can continue until at least one direct link between the existing element that links to the first existing element and the existing element that links to the second existing element is found, wherein a direct link between the first existing element and the second existing element can be established by tracing back the linking process;

wherein the thinking mode search the process structure for process files, and using the process files to make new direct links between the existing elements;

wherein when no direct link between the existing element that links to the first existing element and the existing element that links to the second existing element can be found, the internal control mechanism can operate inquiry mode according to inquiring rules, wherein the inquiries can be sent to display device or output device to inquire information, wherein the input information responding to the inquiries will be processed by inputting mode, reading mode, and thinking mode to find direct link between the first existing element and the second existing element;

Step 70 wherein the new direct link between the first existing element and the second existing element can be saved to the element file of the first existing element and the element file of the second existing element by the memorizing mode according to the memorizing rule, wherein the linking process for linking the first existing element with the second existing element can be saved as a process file to a process structure by the memorizing mode according to the memorizing rule, wherein information including the new direct link between the first existing element and the second existing element can be written to a display device by the writing mode according to the writing rules and the structure rules of the internal control mechanism, wherein the new direct link between the first existing element and the second existing element can be converted to information other than language and outputted as control signal to output device by the outputting mode according to the outputting rule;

Step 80 wherein the internal control mechanism can operate inquiry mode according to the internal control rules, wherein the inquiries can be sent to display device or output device to inquire information, wherein the input information responding to the inquiries will be processed by inputting mode, reading mode, and thinking mode, and memorizing mode to establish new direct links between the existing elements, new direct links between new elements and existing elements of the knowledge structure, and new element files;

Step 90 if new links and/or new element files and/or new process files are established, the internal control mechanism can operate the verification mode to verify new direct links and the new linking processes; the internal control mechanism can also operate the system update mode to update the internal control rules, the structure rules, and the process files in the process structure, wherein the system operator's participations are often needed;

the internal control mechanism can save the operating process of the executing system to system log files in the system log according to the internal control rules.

Figure 2:
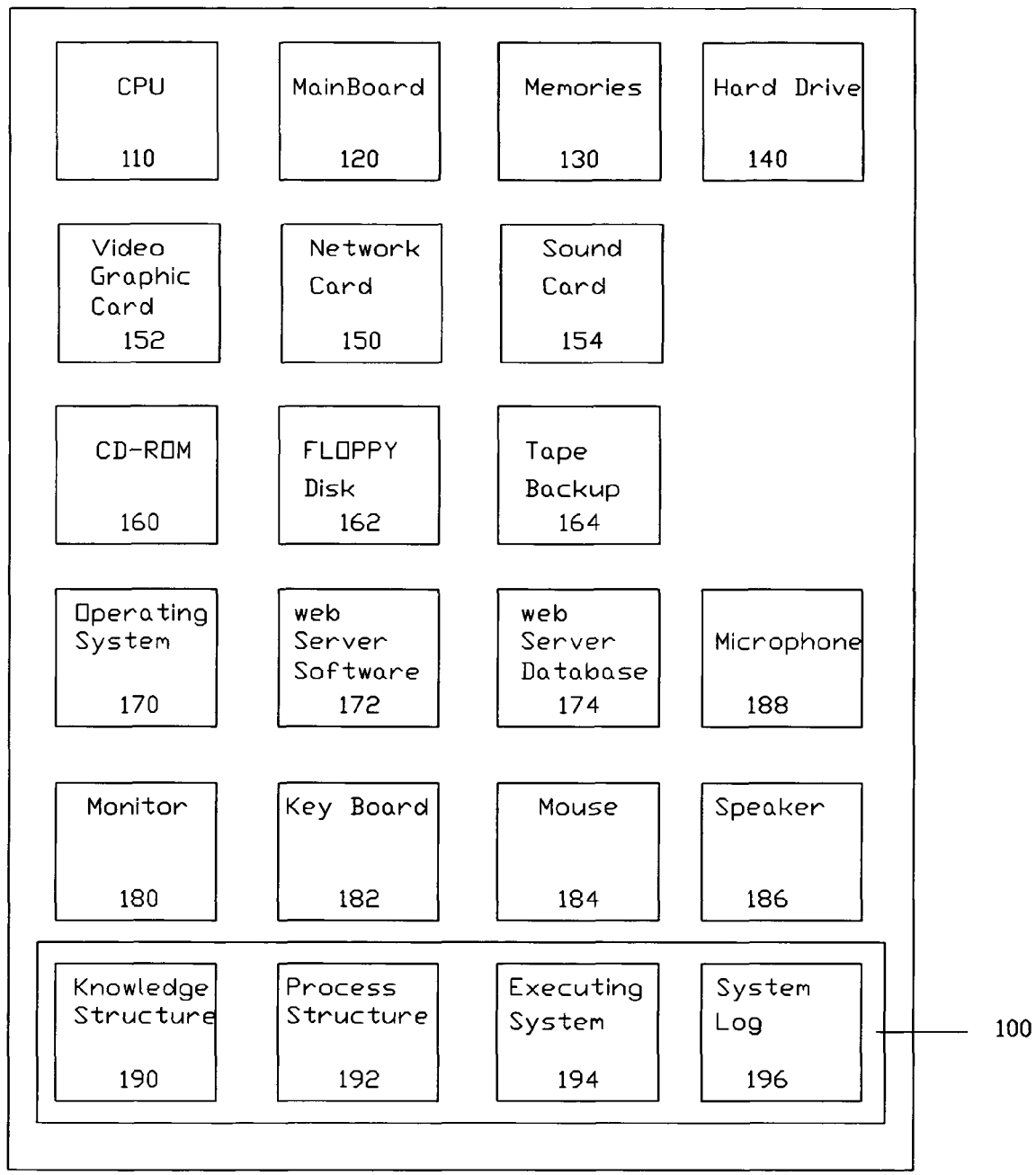
FIG. 2 is a schematic illustration of one preferred embodiment of the implication of the system of the present invention.

FIG. 2 illustrates a preferred embodiment of the implication of the thinking system 100 of the present invention. The hardware and software components supporting the thinking system 100 comprises Central Processing Unit (CPU) 110, Main-board 120, Memories 130, Hard Drive 140, Network Card 150, Video Graphic Card 152, Sound Card 154, CD-ROM 160, Floppy Disk 162, Tape Backup 164, Operating System 170, Web Server Software 172, Web Server Database 174, Monitor 180, Keyboard 182, Mouse 184, Speaker 186, Microphone 188, and a knowledge structure 190, a process structure 192, an executing system 194, and a system log 196.

The thinking system 100 of present invention comprises a knowledge structure 190, a process structure 192, an executing system 194, and a system log 196.

In a preferred embodiment, the knowledge structure 190, the process structure 192 and the executing system 194 can be duplicated.

Knowledge Structure

Figure 3:
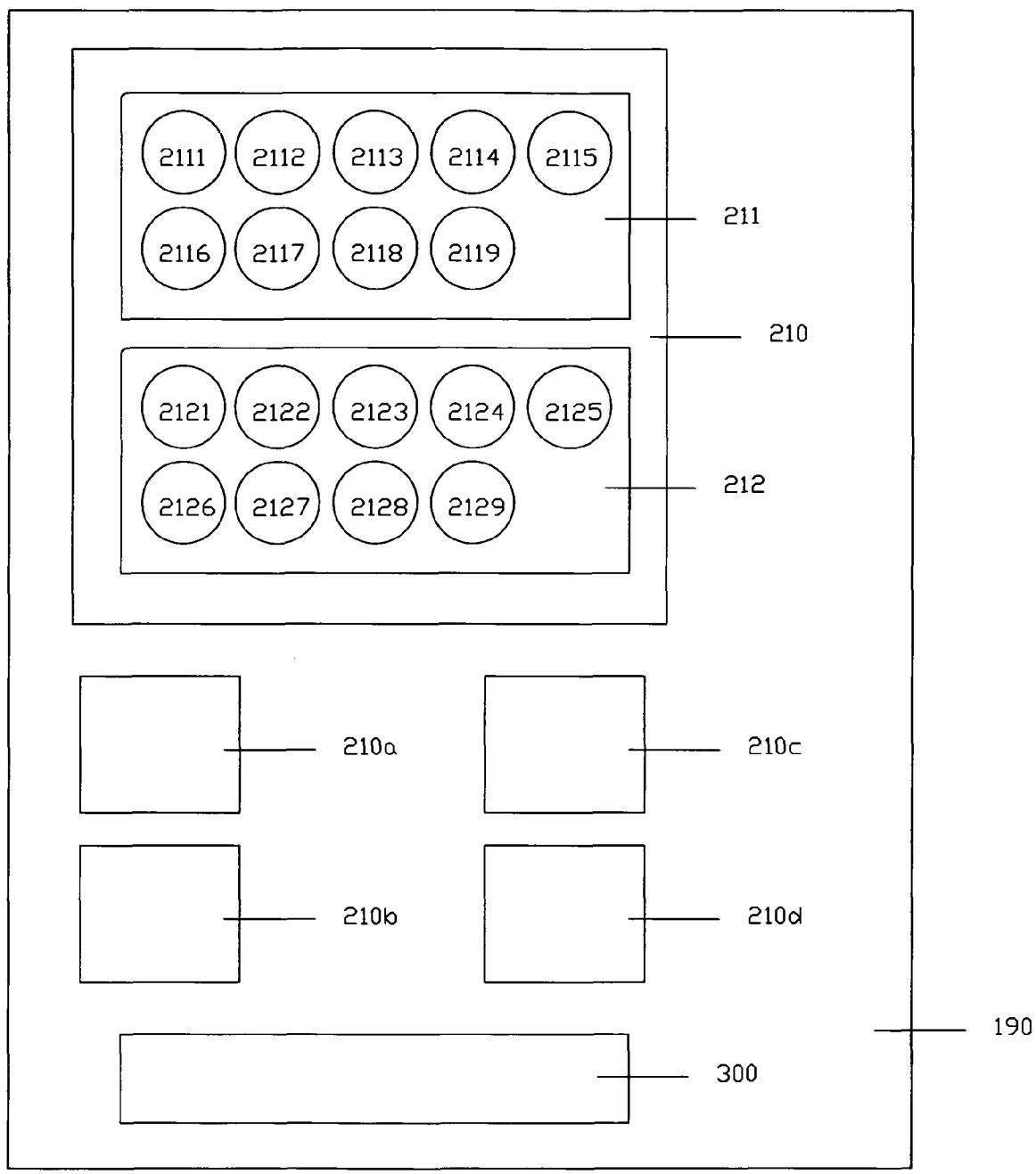
FIG. 3 is a schematic illustration of one preferred embodiment of the knowledge structure of the system of the present invention.

In one preferred embodiment of the present invention, shown in FIG. 3, the knowledge structure 190 of the present invention comprises knowledge files and file organizing mechanism 300.

The knowledge files comprises numerous element files 210. Each element file 210 comprises an identification file 211, and a link file 212.

In a preferred embodiment, the identification file 211 comprises a first identification value 2111, a second identification value 2112, a third identification value 2113, a fourth identification value 2114, a fifth identification value 2115, a sixth identification value 2116, a seventh identification value 2117, a eighth identification value 2118, and a ninth identification value 2119. Different identification values of an element file can trigger different actions of the executing system 194.

In one preferred embodiment, the first identification value 2111 indicates the first element file 210 is a file for a word. The second identification value 2112 indicates what type of language is the word. In general the first identification value 2111 of a element file 210 could indicates whether the element is a word, a phrase, a sentence, a paragraph, a collection of paragraphs, even a book, a process, a symbol, a graphic, a formula, a sound or some other type of record.

The third identification value 2113 indicates whether the word is a noun, a verb, a pronoun, a verbal, an adjective, an adverb, an article, a preposition, a conjunction, or an interjection. In general, the second identification value 2112 through the ninth identification value 1119 could be any feature indication or a blank value.

The fourth identification value 2114 indicates the classes of nouns, verbs, pronouns, adjectives, and adverbs. The nouns are divided into classes including common nouns, proper nouns, collective nouns, count nouns, mass nouns, concrete nouns, abstract nouns. The verbs are divided into classes including transitive, intransitive, linking verbs, and auxiliary verbs. Pronouns fall into several classes including personal pronouns, indefinite pronouns, demonstrative pronouns, the relative pronouns, intensive and reflexive pronouns, intensive pronouns, reflexive pronouns, interrogative pronouns. Adjectives are divided into descriptive adjectives, limiting adjectives, possessives, words that show number, demonstrative adjectives, interrogative adjectives, and numbers, proper adjectives, attributive adjectives, predicate adjectives. Adverbs can be divided into classes of modifiers of verbs, adjectives and other adverbs; sentence modifiers. Words of different classes represent different meanings, usage, and corresponding sentence structures.

The fifth identification value 2115 indicates the forms of nouns, verbs, pronouns, adjectives, and adverbs. Nouns have forms in subjective and objective case, possessive case, and plural. Verbs have forms of simple, past tense, past participle, present participle, and -s form. Pronouns have forms of subjective, objective, possessive. Adjectives have three forms: positive, comparative, and superlative. Adverbs have three forms: positive, comparative, and superlative. Words in different forms reflect their functions, usage, and corresponding sentence structures.

The link file 212 indicates the connections the element has with other elements. The link file 212 comprises a first link information file 2121, a second link information file 2122, a third link information file 2123, a fourth link information file 2124, a fifth link information file 2125, a sixth link information file 2126, a seventh link information file 2127, an eighth link information file 2128, and a ninth link information file 2129.

Figure 4:
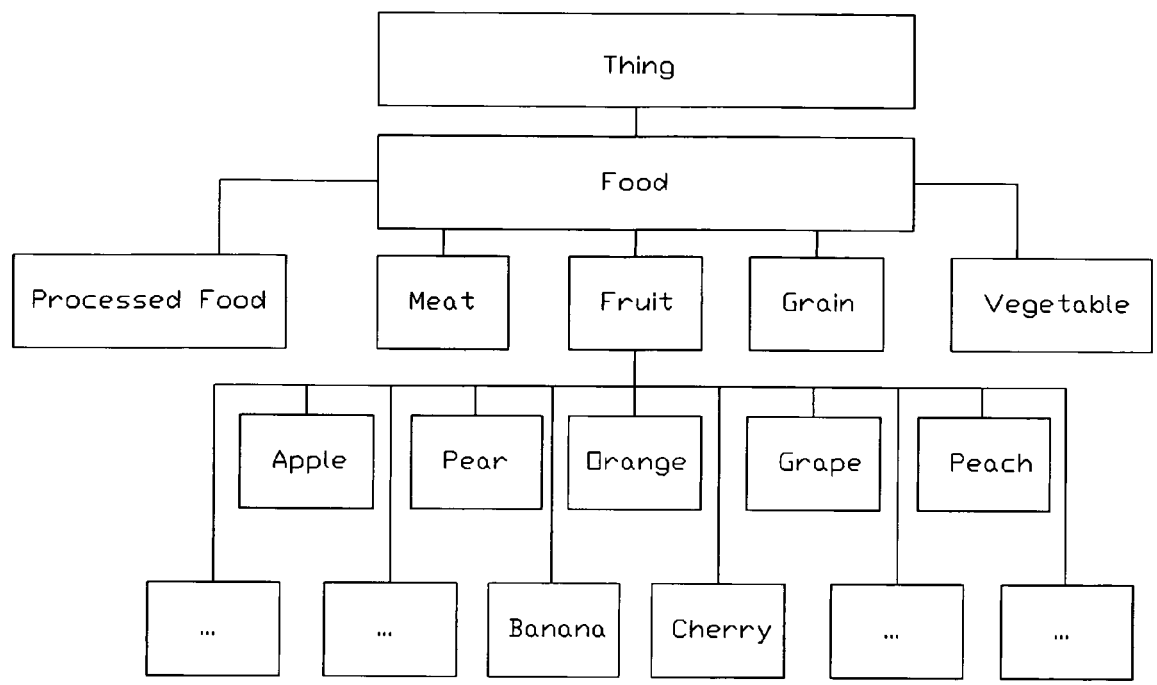
FIG. 4 is an exemplary illustration of a word tree in a first link information file of an element file in the knowledge structure of the system of the present invention.

In a preferred embodiment, the first link information file 2121 establishes vertical connections between words. The first link information file 2121 comprises a word tree field, and an information field. The word tree field contends one or more groups of words connected by a tree like structure, wherein the word in the top of the tree structure is most general in meaning. Going down the tree structure, the words will be more specific in meaning. Preferably, the word tree structure should contain all words that have vertical connection with this element. For example, for the element file for fruit, the word tree field may contain thing, food, fruit, apple, pear, orange, etc. as indicated in FIG. 4. In general, a word in lower level should be able to replace the word in the upper level in just about all sentences. If in some situations there are exceptions (usually when words in the word tree fields have multiple meanings, and only one meaning related to the word of the element file), these exceptions should be provided in the information field. If the word of the element file has more than one meaning, more than one word tree can be provided in the word tree field, and the condition or usage of the different word trees will be indicated in the information field. Phrases can be treated like words as for elements of the element files, or in the element files, with indication that they are phrases functioning as words.

The first link information file 2121 would likely be blank for pronouns, propositions, conjunctions, interjections, and articles.

The second link information file 2122 establishes horizontal connections between words. The second link information file 2122 comprises word field, and word information field. The word field contains words that are interchangeable with the word of the element file 210. If in some situations there are exceptions (for example, when the word has different meanings), these exceptions should be provided in the word information field. The words that have similar meaning with the word of the element file 212 can also be included in the word field, wherein the word information field will contain the differences in meanings and functions of the words. The word field may also contain the words in different forms with the same meaning as the word of the element file 210, wherein the word information field will indicate difference in usages and functions. The word field may also contain words in other languages that have similar meanings as the word of the element file 210, wherein the word information field will indicate the usage and corresponding sentence structures information, etc. Phrases can be treated like words as for elements of the element files, or in the element files, with indication that they are phrases functioning as words. The second link information files are especially useful for nouns, verbs, pronouns in related to different forms, or tenses, or moods, or voices and their usages.

Pronouns are used as the replacement of nouns. The second link information file 2122 for a pronoun will indicate the noun or nouns that the pronoun is equivalent in meaning and usage to. Difference forms can also be indicated with the information in different usages and functions.

The second link information file 2122 would likely be blank for propositions, conjunctions, interjections, and articles.

The third link information file 2123 establishes the way the word will be used in a sentence. The information in the third link information file 2123 usually contains information for the specific ways the word is used in sentences. The third link information file 2123 comprises a link field, and a link information field. For nouns, pronouns, the link field may contain their effects on verbs to change forms, the specific words they can be associated with, and specific changes in the sentence structure. For a noun, this file may indicate the link between the phrases that contain this noun with other words. For a verb, the link field may contain sentences that reflect the sentence structures of which the verb can be used. By using the words (nouns, pronouns, other verbs, etc.) that are most general in meaning to construct the sentences, the links between this verb and other words can be established. The link information filed indicates the condition for the verb can be used in these sentences. For example, for the word "eat", the link field may contain: "Animals eat food. I eat food. I am eating food now. I ate food in the past. I have eaten food before. Animal eats food."

The third link information file 2123 can also establish links for words in different groups but have related meaning. For example, verb "act" is related to noun "action". This link can be indicated in the third link information file 2123 for both words.

For propositions, conjunctions, interjections, and articles, the third link information file 2123 may indicate the functions of the word of the element file in the sentences. A proposition always connects a noun, a pronoun, or a word group functioning as a noun to another word in the sentence. The noun, pronoun, or word group so connected is the object of the preposition. The preposition plus its object and any modifiers is a prepositional phrase. The third link information file 2123 of a proposition may contain commonly used prepositional phrase wherein other words in the phrases are in most possible general terms in meanings.

The fourth link information file 2124 establishes the conditions or occurrences that will cause the action or condition represented by the word. This file can be blank for the word of the element file that is a noun, pronoun. For verbs, this file can provide information as to why the action takes place. The link between the cause and the word of the element file can be absolute, i.e., if the conditions or occurrences are true, then the action that is represented by the word of the element file will occur. This is often represented by "if and then" phrase, and other words in the sentence should be the most general type of the words. For example, for word "rotate", one sentence in the fourth link information file 2124 could be: "if a net eccentric force is applied to an object, then it will rotate." You can see this type of links usually exist for natural occurrences. Sometimes, the link may or may not be true, depend on certain conditions. For example, for the word "boil", one sentence establishes the link could be: "if the water temperature is 100° C., then it will be boiling in the normal atmosphere." In this case, the temperature and pressure are both conditions for the water to boil. For some words, especially the words reflect the mental states or the actions of humans, or other living things, the links are not as certain. Then the sentences that reflect these links should reflect these uncertainties. For example, for the word "laugh", one of the sentences establishes the link could be: "if one finds something interesting, then it is possible that this person will laugh". The possible link could also be expressed using "because": "Because I found something interesting, I laughed." There could be more than one conditions or occurrences that will cause the action represented by the word. Therefore, the fourth link information file 2124 could contain numerous if-then sentences.

For adjectives, the fourth link information file 2124 may provide information why the condition exists. The link between the cause and the condition can also be absolute, conditional, or a possibility. For example, for the word "wet", one sentence establishes the link could be: "if it rains, then the ground will be wet". For the word "rotatable", one sentence establishes the link could be: "if the object is not fixed, then it is rotatable". For the word "red", one sentence established the link could be: "if the a person is embarrassed, the person's face could turn red." The fourth link information file 2124 may also provide information why the condition exists for adverbs.

The fifth link information file 2125 establishes what will be the result of the action represented by the word. This file is for verbs mostly. The link between the word and the result can be absolute, conditional, or a possibility. The sentences could also be in the format of "if-then". For example, for the word "burn", one sentence establishes the link could be: "if a piece of material is burning, then it will consume oxygen." For the word "hit", one sentences establishes the link could be: "if an moving object is hit, then it will change directions." For the word "run", one sentences established the link could be: "if a person is running, then this person may be sweating." As for the fourth link information file, there should be numerous links in the fifth link information file for the most time. It is the goal of the link files, as well as of the fourth link information files and the fifth link information files, to establish all possible links between words or phrases through direct links and indirect links.

The sixth link information file 2126 contains identifying attributes and informational attributes of the word. The attributes are words that describe the characteristics of the word of the element file. Generally speaking, the sixth link information file 2126 is for nouns, and maybe verbs. The contents are words that define the fields and defined fields with or without values. For word that is general in meaning, most of the defined fields will not have values. For word that is the most specific, all the fields may have values. For example, a word "person" will have information attributes such as birthday, height, weight, blood type, education, number of brain, arms, etc., but most of field will be blank, except for one brain, two arms, etc. For a word "Elvis", his birthday, blood type, education, etc, will all have a value. But here you can see the word "Elvis" is not the most specific, only if when you say "Elvis at 10:01 Jun. 1, 1951", will you have the actually weight information. Words less general in meaning share the attributes for words that are more general in meaning linked by the word tree, but words general in meaning usually do not share all the attributes of the words less general in meaning linked by the word tree. Alternatively, the attribute information can be expressed in plain language. The identifying attributes usually are attributes with values that are unique to the element. The informational attributes can be in any thing related to the element. The format for the attributes can be as sentences or tables or forms, formulas, etc.

It can be noticed that if an attribute (especially an identifying attribute) of a word that does not have a value is assigned with a value, it will be equivalent to a word that is less general in meaning and linked by the word tree. For example, "person" is more general than "teacher" and linked with "teacher" by the word tree. So, a person who teaches will be a teacher.

People or places may have the same names but have different attributes. For example, John Smith is a frequently used name for many males, but they will have different birthdays, different heights and weights, and different occupations, and different personal characteristics. Paris in France is totally different from Paris in Texas of United States. The differences in the attributes may be reflected in separate and distinguish files in the sixth link information files, but it may be better that different element files are established for each person or place. These element files can be arranged in sub-element files under the same general names, and distinguished by distinct attributes.

Adjectives and adverbs usually indicate where, when, how, or to what extent, these features can be defined attributes of the nouns or verbs. Many adjectives can provide values or information of the attributes of the nouns. For example, green can be the color of an object, such as Granny Smith apple. Therefore, green can be value of the color attribute of the Granny Smith apple.

The seventh link information file 2127 establishes connections between word that indicates attributes of other words with those other words. This link information file indicates links that is the reverse side of the sixth link information file 2126. If a word is usually used as attribute or description of other words, then this file identify the word that this word defined or being attributed for. To reduce the size of the file, if the word is an attribute for a group of words linked by word tree, the seventh link information file 2127 may include only the word most general in meaning. For example, the word color can describe a physical existence, i.e., a thing. Therefore, seventh link information file 2127 may indicate that color is an attribute of a thing. It does not need to including other words that are less general in meaning and linked with "thing" by word tree, such as, tree, apple, chair, human, etc.

The comparative form or superlative form of adjectives and adverbs establish links for objects with similar values of the attributes.

The eighth link information file 2128 indicates the derivative attributes or derivative values of the word of the element file. For example, for word "place", geographic location will be attribute for the place, and derivative attributes will be distance of this place with other places.

The ninth link information file 2129 indicates the connections between word that indicates the derivative attributes of other words with those other words. This link information file indicates links that are the reverse sides of the information indicated by the eighth link information file 2128. If a word can be used as derivative attribute of other words, then this file identify those other words. To reduce the size of the file, if the word is a derivative attribute for a group of words linked by a word tree, the ninth link information file 2129 may include only the word most general in meaning in the word tree.

The fourth link information file 2124, the fifth link information file 2125, the sixth link information file 2126, the seventh link information file 2127, the eighth link information file 2128, and the ninth link information file 2129 would likely be blank for propositions, conjunctions, interjections, and articles.

Other link information could be indicated in these link information files or other link information files.

If the element is a phrase, the first identification value 2111 indicates it is a file for a phrase. The second identification value 2112 indicates what type of language is the phrase. The third identification value 2113 indicates whether the phrase has the function of a noun, a verb, an adjective, an adverb, a preposition, a conjunction, or an interjection.

The link information file for a phrase will be similar to the file for the word that the phrase is equivalent in functions for. One specific difference is that the phrase can have most simplified form and more complex form. Generally, adding more words besides the key words will make the phrase more complex, and provides more specific meaning. The different form for the phrase can be provided in the first link information file and/or second link information file of the phrase.

Prepositional phrases usually function as adjectives or as adverbs, occasionally as nouns. The link information file for prepositional phrases may contain adjectives, adverbs, or nouns that they are similar to in meaning and function. The link information file may also contain information for special uses of the prepositional phrases in sentence.

Participles, gerunds, and infinitives—like other forms of verbs—may take subjects, objects, or complements, and they may be modified by adverbs. The verbal and all the words immediately related to it make up a verbal phrase. Like participles, participial phrases always serve as adjectives, modifying nouns or pronouns. Gerund phrases, like gerunds, always serve as nouns. Infinitive phrases may serve as nouns, adjectives, or adverbs. Because participle phrase could have same form as gerund phrases, the phrase link information file may have more than meaning and/or function depending on the how they are used in sentences.

Absolute phrases consist of a noun or pronoun and a participle, plus any modifiers. Special use or meaning of the absolute phrases should be indicated in the link information file.

If the element is a symbol, a graphic, a sound or some other type of record, the second identification value 2112 through the ninth identification value 2119 could be any feature indication or a blank value. The element files may contain the link between each other, the link between it and a word or phrase, and other information related.

For a symbol, it may help to identify sentence structures, meaning and function of words and phrases, these information may be indicated by identification values and link information files.

Executing System

Figure 5:
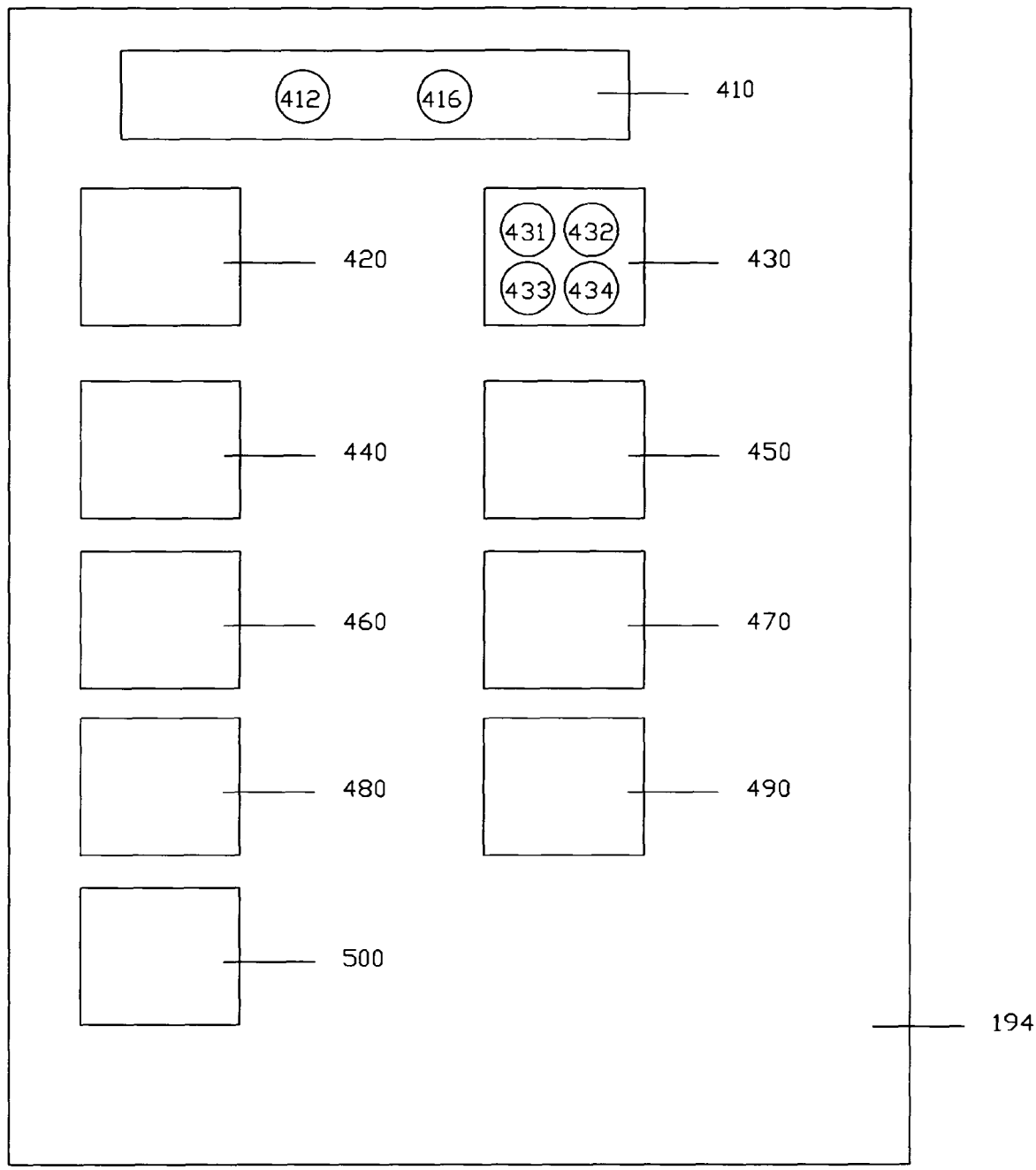
FIG. 5 is a schematic illustration of one preferred embodiment of the executing system of the system of the present invention.

As seen in FIG. 5, the executing system 194 comprises an internal control mechanism 410, an inputting mode 420, a reading mode 430, at least one thinking mode 440, a writing mode 450 and a memorizing mode 460, an outputting mode 470, an inquiry mode 480, a verification mode 490, and a system update mode 500. The internal control mechanism 410 includes internal control rules 412 and structure rules 416. The inputting mode 420 includes inputting rules, wherein the reading mode 430 includes reading rules, wherein the thinking modes 440 include thinking rules, wherein the writing mode 450 includes writing rules, wherein the memorizing mode 460 includes memorizing rules, wherein the outputting mode 470 includes outputting rules, wherein the inquiry mode 480 includes inquiring rules, wherein the verification mode 490 includes verification rules, wherein the system update mode 500 includes system update rules. The internal control mechanism 410 can control the inputting mode 420, a reading mode 430, a thinking mode 440, a writing mode 450 and a memorizing mode 460, an outputting mode 470, an inquiry mode 480, a verification mode 490, and a system update mode 500, wherein the internal control mechanism 410 can operate constantly.

If the internal control mechanism 410 detects input information from the inputting devices, the inputting mode 420 will be activated according to the internal control rules. According to the inputting rules, the inputting mode 420 takes input information from inputting devices such as key board, microphone, internet site, digital camera, scanner, and other inputting devices and converts the input information into format that can be readable by the executing system 194.

The reading mode 430 processes information received from inputting devices and converted by inputting mode 420. Preferably, the reading mode 430 comprise word processing 431, image processing 432, sound processing 433, and other information processing 434. For word processing 431, one default language can be set, and can be overwritten by inputting information. For word processing 431, the information preferably will be divided into sentences by specified sentence dividing mark, or symbolized either by combination of period (or question mark, exclamation point, etc.), space and capital letter, or by other symbols. In reading the sentences, each word in the sentences will be identified by searching and locating the corresponding element file of each word or phrase in the knowledge structure according to the file organizing mechanism, then the element files will be loaded to a temporary location easily accessible by the executing system 194.

In thinking mode, the executing system 194 will read information from identification files of the element files and find out whether the word is a noun, a verb, a pronoun, etc. The executing system 194 contains standard sentence formats in the structure rules that can be compared with input sentences. By comparing the sentence format, the input sentences can be divided into three types, a statement, a command or a question. A statement basically provides new information to establish new links. A command demands action. A question usually presents a problem that needs to be solved. For a sentence that is a statement, the executing system 194 will further identify the sentence format to determine what link the sentence is creating.

A sentence usually contains subject and predicate. In general, there are about five basic sentence structures. The subjects of the sentences are similar, consisting only of a noun and an article or marker. But each predicate is different because the relation between the verb and the remaining words is different. In the first sentence structure, the predicate consists only of the verb, which is called intransitive verb. This type of sentence usually indicates the actions the entity presented by the noun takes. At least in mostly cases, reading the element file for the verb, especially the fourth identification value 2114, the type of the sentence structure can be determined. The fifth identification value 2115 can be used to verify the sentence structure. Then the third link information file 2123 will provide more detailed and specific sentence structures related to the verb, including any indication of conditions such as where, when, why, who and how. Comparing the input sentence with the specific sentence structure, any missing parts can trigger inquiry mode 480 to request missing information. If no information is missing, from information from the first link information file 2121, the second link information file 2122, the fourth link information file 2124 and the fifth link information file 2125, other information can be obtained as the causes of the action or the results of the action indicated in the input sentence, thus new links can be created such as new conditions and occurrences related to the subject or new subjects.

In the second sentence structure, the predicate consists of a verb followed by a noun. The noun completes the meaning of the verb by identifying who or what receives the action of that require direct objects to complete their meaning are called transitive. This type of sentences usually indicates the changes of the noun in the object because of the action took by the noun in the subject. Reading the element file for the verb, especially the fourth identification value 2114, the type of the sentence structure can be confirmed. The fifth identification value 2115 can be used to verify the sentence structure. Then the third link information file 2123 will provide more detailed and specific sentence structures related to the verb, including any indication of conditions such as where, when, why, who and how. Comparing the input sentence with the specific sentence structure, any missing parts can trigger inquiry mode 480 to request missing information. If no information is missing, from information from the first link information file 2121, the second link information file 2122, the fourth link information file 2124 and the fifth link information file 2125, other information can be obtained as the causes of the action or the results of the action indicated in the input sentence, thus new links can be created such as new conditions and occurrences related to the subject, object or new subjects, or new objects.

In the third sentence structure, the predicate also consists of a verb followed by a single noun. But here the verb serves merely to introduce a word that renames or describes the subject. The noun following the verb in this kind of sentence is a subject complement, or a predicate noun. Verbs in this pattern are called linking verbs because they link their subjects to the description that follows. The subject complements in this sentence pattern may also be adjectives. Adjectives serving as complements are often called predicate adjectives. By reading the element file for the verb, especially the fourth identification value 2114, the type of the sentence structure can be determined. The fifth identification value 2115 can be used to verify the sentence structure. Then the third link information file 2123 will provide more detailed and specific sentence structures related to the verb, including any indication of conditions such as where, when, why, who and how. Comparing the input sentence with the specific sentence structure, any missing parts can trigger inquiry mode 480 to request missing information. This type of sentences usually establishes the links between the two nouns in the sentences, the noun as subject complement is more general than the noun as the subject. In this case, the first link information file 2121, and the second link information file 2122, or sometime the third link information file 2123 of the two nouns can be updated. The adjectives usually provide values for the attributes of the nouns. In this case, the sixth link information file 2126 or eighth link information file 2128 of the noun may be updated adding the adjective to the attribute value.

In the fourth sentence structure, the predicate consists of a verb followed by two nouns. The second noun is a direct object, the first noun is an indirect object, identifying to or from whom or what the action of the verb is performed. This type of sentences usually means the exchange of an item, information from the noun of the subjective to the noun of the indirect object. By reading the element file for the verb, especially the fourth identification valve 2114, the type of the sentence structure can be verified. The fifth identification value 2115 can also be used to confirm the sentence structure. Then the third link information file 2123 will provide more detailed and specific sentence structures related to the verb, including any indication of conditions such as where, when, why, who and how. Comparing the input sentence with the specific sentence structure, any missing parts can trigger inquiry mode 480 to request missing information.

The information in this sentence can be used either to update the sixth link information file 2126 for noun of the subjective and the noun of the indirect object, or to obtain information such as the causes of the actions or the result of the action from the fourth link information file 2124 and the fifth link information file 2125 of the verb with the help of information from the first link information file 2121, the second link information file 2122 of the nouns and verbs.

In the fifth sentence structure, the predict also consists of a verb followed by two nouns. But in this pattern the first noun is a direct object and the second noun (object complement) renames or describes it. This type of sentences usually means that the noun as the direct object has direct link with the noun as object complement. Usually the noun as object complement is more general than the noun as the direct object. The complicity of this type of sentences is that it also indicates the noun in the subject is the cause or reason that the link between the direct object and the object complement exists. This might make the link more contingent, therefore the link more likely become conditional link.

The information obtained from the thinking mode will be saved in a temporary status by memorizing mode 460, and then the executing system 194 will read the next sentence. If the thinking system is given a problem to solve, or a task to perform, one or more sentences could be command or question sentence. The command or question sentence can be detected in a few ways. For example, if a sentence starts with the word "do", "is", "have", etc., or interrogative pronouns, and ends with a question mark, then the sentence is a question sentences. If a sentence starts will a verb without a subject in front, then the sentence could be a command sentence. The tasks can also be inputted by specified ways that can trigger the required act by the internal control mechanism 410 of the executing system 194.

Sentences could have other words or phrases that usually indicate where, when, why, who and how. Compound sentences are more than one basic sentences usually marked by conjunctions. The thinking mode 440 should be able to detect the words that indicating the functions and sentence structures according to the information in the element files.

In reading sentences, tracking the relationship between pronouns and related nouns could be accomplished by trial and error. A pronoun replaces a noun that appears prior to the pronoun. When more than one nouns appears before the pronoun that can be replaced by the pronoun, these nouns can be placed in the position of the pronoun in the sentence. Usually the meaning of the nouns will indicate which one is in right place in cooperation with the sentence. If uncertainty arises, the internal control mechanism can either enact inquiry mode 480, or provide alternative output based on different assumptions.

The common questions and tasks include the quests for values, verifications, etc. First, the sentence will be read as for the statement sentence, identify each word, searching, locating element file of each word, and determine whether the word is a noun, verb, pronoun, etc. The basic approach for solving a problem is to first identify what is the critical word or words according to the sentence structure, i.e., what the question or task calls for, then read the element file of the critical words, through links in the element file to find other words related to the critical words. Each word will be compared with the words in the element files in the temporary elevated status (element files in the knowledge structure related to input information that are loaded to areas easily accessible by the executing system), until a match occurs. If no match was found, the executing system will locate the element files of the words related to the critical words and search the contents of the these element files to find more related words to the critical words. Meanwhile the executing system will locate and elevate element files of the words that are in the contents of the element files that is in the temporary elevated status, to the temporary elevated status as well, and then the words related to the critical words will be compared to the contents of the newly elevated element files, to find a match. The process can be continue until all related element files have been compared and a match is found, or controlled by external interruption or internal control. If no match can be found, the executing system 194 will make inquires about missing link. This process basically traces the links of the critical words and the given words, until there is a cross point where link can be established.

When thinking mode 440 is put into action by internal control mechanism 410 according to the internal control rules, not triggered by input information, the thinking mode 440 can make new direct links between existing elements according to the information in the existing element files, or make new link process files according to the existing link process files and information in the existing element files. According to the internal control rules, the internal control mechanism 410 can also try to make assumptions such as providing hypothetical tasks imitating the real life tasks and try to complete the tasks so that to obtain new direct links and new link process files.

The information obtained can first be expressed in sentences by the writing mode 450. For an answer to a question, the word directly links to the critical word usually replace the critical word in the question sentence, and the sentence is transformed into a statement sentence. For different task, the way of writing may be different, it is basically placing relevant words in sentence formats determined by the executing system 194 according to the structure rules.

The sentences from writing mode can be delivered to output device by outputting mode 470, wherein they can be displayed to the user or control some devices.

In a preferred embodiment of the present invention, once the success links are established, the routes for making the link are identified and saved by the memorizing mode 460. This information can be saved in a preferred process file of the process file structure, wherein the element files of the given words and critical words, and important link words will contain information referring to this process file. The process file can be identified by the given words, critical words, and/or important link words.

The preferred process file can be generalized and expended to provide more link route by thinking mode 440. When the process file structure is established, the problem solving process may start with search the process file structure for process file that matches the given words and critical words of the problem. This will save time and effort.

In a preferred embodiment, the entire process of the executing system may be document and identified by contents and time of execution by memorizing mode 460, and can be used for verification, generalization, and expansion of the process file, and any other purposes.

In a preferred embodiment, the new link information can be verified by verification mode 490, generalized, and expended to update the related element files by thinking mode 440 memorizing mode 460.

In a preferred embodiment, the operating process of the executing system 194 can be saved according to operating time of the executing system 194 and related element files and link process files to system log files in the system log. The system log files can be used for many purposes. They will be especially useful when certain direct links in certain element files need to be revised, for the system log files can provide the records of changes to other element files or link process files in the past based on those direct link information and revise other element files or link process files.

The verifying, generalizing, expending capabilities are part of the special features of the system of the present invention, whereby the system of the present invention is more self-sufficient, self-learning, progressive. Combined with feature of inquires, and self-controlled operating capacities, the present invention will be able to expand the knowledge structure, process structure with little exterior assistance once the basic structures are established. Because the system of the present invention not only can read and understand input information and perform related task, it can also learn and improve itself, it is truly intelligent.

Because some links between elements are conditional, or only possible links, the thinking mode can provide alternative links or possible links between relevant elements. Therefore the output of the thinking process can be alternative or possible links. The conditions for the alternative output will be provided, and the degree of possibility can also be reflected in the element files and the output information.

In one preferred embodiment, the present invention may contains multiple knowledge structures that can be multiplied and revised, wherein one basic multiple knowledge structure contains links that are general, and other multiple knowledge structures are modified to reflect specific environments these knowledge structures represent. This arrangement makes sense because the human knowledge system is highly subjective. In one person's opinion the link may be true, but another person may think no link existed. Having separated knowledge structure may limit the information to the most accurate condition, while using the available information to the full extent.

Example in Application of the Present Invented

The application of the present invention is very broad. It basically can perform any task related to the understanding of the human language and needed intelligent thinking.

Translation

Every element files of the words or phrases may contain the counterpart words or phrases along with special application conditions or restrictions in other languages. The basic sentence structure in one language should have a corresponding sentence structure in another language, with conditions and restrictions. Once executing system recognizes the words and sentences in one language, it would be able to structure sentences and place words in another languages.

Document Summarization

A document may be in a few types. It could be a story, a statement, an argument, an illustration, etc. There are differences between them, but in general, they are all about describing actions, ideas, situations, etc. The focus is always about nouns and verbs, other words are used to limit, describe, and complete the full picture, but the degree of importance decrease. Therefore, the content of a document can be restated with less words while deliver the message in certain degree. This is summarizing. Until now, truly summarizing a document can only be performed by human with sufficient knowledge and skill, it is considered an task required intelligence. A well developed model of the present invention should be able to perform this task with ease, so that the value of the present invention can be more obvious.

Two possible procedures can be used to perform the summarization task. One, key words or contents could be partially given, the system needs to subtract information related to the key words or contents. Another, the system will first need to determine what is the key words or contents of the document, then proceed to find related information to the key words or contents.

Assuming no key words or contents are given, then executing system need to first find the key words or contents.

In a preferred embodiment, the executing system will first find the key words or phrases in each sentence, then compare the key words or phrases to find key words or phrases, or sentences in a paragraph. Then the key words or phrases or sentences of each paragraph will be combined to find key words or phrases or sentences for the chapter and so on. Depend on how much summarization is needed, the keys words or phrases or sentences in each level can be part of the summary to give a little detailed information besides the central key words or phrases or sentences.

To find the key words or phrases in a sentence, the executing system will first read the sentence, by recognizing each word or phrase, and simplify the structure of the sentence to a basic sentence structure. The words or phrases that construe the basic sentence structure will be the keys words or phrases. Generally speaking, in a compounded sentence, some key words or phrases usually will be in the main body of the sentences, if not all of them.

This paragraph is taken from Federal rules of evidence:

A person has a privilege, which may be claimed by him or his agent or employee, to refuse to disclose and to prevent other persons from disclosing a trade secret owned by him, if the allowance of the privilege will not tend to conceal fraud or otherwise work injustice. When disclosure is directed, the judge shall take such protective measure as the interests of the holder of the privilege and of the parties and the furtherance of the justice may require.

When read this paragraph, it is easy to spot the clause "which may be claimed by him or his agent or employee", "if the allowance of the privilege will not tend to conceal fraud or otherwise work injustice" and phrase "to refuse to disclose and to prevent other persons from disclosing a trade secret owned by him" as descriptive, the simplified form of the first sentence will be "A person has a privilege" in "subject+transitive verb+direct object" form. In the same way, the simplified form of the second sentence will be "The judge take the privilege". If only one key word is provided to summarize the paragraph, it will be "privilege".

As you can see the process of summarization can be simply recognizing the phrases and clauses by spotting proposition words, and verify the noun, verb structure. It is not always as easy as this. For example, in the second sentence, "privilege" is replaced by "protective measure", this requires the executing system to read element file of the word privilege, and find out that "protective measure" in some meaning file of the privilege and map it to the second sentence and replace the "protective measure" with "privilege".

I didn't mention the title of this rule is "trade secret". Generally, title should be a key word in summary, then the key sentence will be "A person has a privilege to refuse to disclose and to prevent other persons from disclosing a trade secret".

If "trade secret" and "privilege" are given as key words or phrases, the process may be simplified, while results would be the same. However, if not title is given for the paragraph, the result would not be the same, the trade secret aspect of the paragraph will be missing. So, summarization would provide better results if key words are given.

Search Engine

The system of the present invention will improve the function of internet, database or other searches greatly. In the current practice, if you type in a word or a few words in combination, only sites will these words will appear, and usually in random order, you have to look through each of them to find the one you want, and sometime, because you did not input the exact words, you cannot even find the place you are interested while wasted your time.

With system of the present invention, you can find the exact place you intent to find. Basically, the system will be your research assistant. When you type in the words, the executing system will locate the element files for these words and find the words with similar meaning and starts the search, as the places that search conducted are pre-organized by the system of the present invention, and summaries and key words are available, the search process becomes a key word match process, thus to obtain more precise results. Then the executing system will analyze each result and verify if them are the intended results, and then present the results in the order of most relevant. If no desirable result or too many results appears, the executing system will ask questions and modify the search according to the feedback.

Problem Solving

As an illustration of problem solving, assume one task is input to the system of the present invention:

"I am going to New York. How long will it take (for me to get there)?"

The executing system of the thinking system can read the sentences and identify and locate each element for the words in the sentences. The executing system will first read identification file of the element file for each word to determine sentence structure information. For the first sentence, the sentence structure is the first basic sentence: Pronoun+verb. For the second sentence, the sentence structure is the question format (Interrogative adverb+adjective+verb+auxiliary pronoun+verb?) of the second basic sentence structure: Pronoun+verb+noun. Therefore, the first sentence is a statement, and the second sentence is a question. The first sentence provides information, and the second sentence requires an answer. The complete sentence structure of the first sentence is: Pronoun+auxiliary verb+present participle+preposition+noun phrase. The complete sentence structure of the second sentence is: Interrogative adverb+adjective+auxiliary verb+pronoun+verb? Some words have more than more meanings and may belong to different word groups and/or classes. For example, "am" could be a link verb or auxiliary verb. The sentence structure and word combination information can be used to determine which meaning or word group applies. For example, the third link information file of the element file of the word "am" may contain information that "am" as auxiliary verb will be followed by past participle or present participle. Since in the first sentence "am" is followed by "going" which could be present participle, then "am" is an auxiliary verb in the first sentence.

The third link information file of the element file of the word "going" may contain a sentence structure like: "Person be going to place from place." Compare this sentence with the first sentence of the task, it is apparent that "from place" phrase is missing. This information can trigger the inquiry mode of the executing system wherein a question will be asked. To compose a question about a noun, an interrogative pronoun or interrogative adjective with the noun will be the first word or word. Here, either "where" or "which place" can be used. The rest of the sentence would be the question format of the first sentence: Where (which place) are you going to New York from? This sentence is little unusually as than ordinary sentence, but goal is to construct a sentence inquiring information. The answer to this question could be just the name of the place, the phrase "from (the place)" or a sentence. The executing system will take this information and rewrite the first sentence. For example, if the input is "Los Angeles", the first sentence will be: I am going to New York from Los Angeles.

The second sentence will also be analyzed. The word "long" has different meanings, it can relate to dimensions or time. Reading the third link information file of the element file for the verb "take", one specific sentence structure mostly likely matches the second sentence: Action take person time. The first link information file of the element file for verb "going" should indicate that "act" is more general in meaning than "going". The second link information file of the element file for noun "action" should indicate that "action" is equivalent in meaning with act, while "action" is a noun, and "act" is a verb. Following the links indicated in the element files for words in the sentence, the sentence "Action take person time" could be replaced with "Going to New York from Los Angeles takes me time."

This sentence structure can be compared with the second sentence. Then it be comes obvious that "how long" refers to time. Therefore, the critical word of this problem is time (or time spent). Looking into the element file of "time", the eighth link information file may contain information that time is the derivative attribute of distance, wherein the value of the time will equal to the distance divided by speed of traveling (moving).

This information can also be reflected in the fourth link information file of "going", wherein the information will be indicated as: If person is going from place to place, then the time spent will be the distance between the places divided by the speed of traveling.

Looking into the element file of "place", geographic location will be the identifying attribute. With this knowledge, the difference between the geographic location of New York and Los Angeles, which would be indicated in the eighth link information file of both element files, i.e., the distance between the two places should be marked as significance.

At the same time, the sixth link information file of the element file for phrase "from place to place", which is equal to "to place from place", will have distance as an attribute, which will be blank for this general form. For phrase "from Los Angeles to New York", the attribute "distance" will have a value.

Looking into the first link information file of "going", it should be indicated that "going" is more general in meaning than "walking", "running", "driving", "taking a train", and "flying". The second link information file of "going" should indicate that "going" is similar to "moving". The sixth link information file of "going" should indicate that speed is an attribute of "going" that is not assigned value. In the sixth link information file for "walking", "running", etc., the attribute "speed" would have assigned value.

At this point, the executing system can either activate inquiry mode to ask: How are you going to New York? Then proceed according to the response. Or, the executing system may obtain time span for each way of traveling according to the link information obtained. The time as the answer for the problem will be written as: It will take (time) by walking . . .

. It will take (time) by flying. Then the outputting mode will send the answer to external device.

The process of analyzing element files and making links may vary in the steps, yet result would be similar.

Intelligent Assistant (Expert)

The thinking system of the present invention could answer questions according to information included in the knowledge structure. It can provide information in response to input questions. For example, you can input: Tell me about New York. The intelligent assistant (thinking system) will read information in the element file of New York, and use information in the link information files to write output. It usually describes something, so the link information file indicating attributes or derivative attributes will be used mostly of the time. The process is similar to the problem solving process.

Conclusion

The teaching of this invention includes that the human knowledge system should be indicated as a knowledge structure where elements in the structure have multiple links with other elements. The way of expressing the links should not be limited to what is described in this application. Other links can be used as well.

What is claimed is:

1. A method for operating a human-made thinking system including one or more CPU's, one or more I/O devices, and one or more memories, comprising the steps of : (a) establishing in said one or more memories a knowledge structure comprising a file organizing mechanism, and more than one element file wherein each element file individually and separately includes identifying information and knowledge information corresponding to only one element; wherein the identifying information categorizes and identifies the corresponding element, wherein the knowledge information includes knowledge about the corresponding element, wherein the knowledge is information related to at least one direct link of each element with one or more elements of the knowledge structure thus connects element to at least one other element; (b) establishing a process structure comprising at least one process file; (c) establishing an execution system comprising an internal control mechanism, and at least one thinking mode; wherein the internal control mechanism includes at least one internal control rule, and at least one structure rule, wherein the thinking mode includes at least one corresponding thinking rule; (d) running the executing system wherein the internal control mechanism can operate without human intervention wherein the thinking mode can be activated according o the internal control rules of internal control mechanism; wherein according to the thinking rule, a direct link between a first existing element and a second existing element can be used to establish one or more new direct links between said first existing element and at least one other existing element that has an existing direct link with said second existing element; wherein according to the thinking rule, process files can be used to establish new direct links between the existing elements, and store or output said new direct links as desired.

2. The method as claimed in claim 1, wherein the executing system further comprises an inputting mode, a reading mode, a writing mode, a memorizing mode, an outputting mode, an inquiry mode, verification mode, and a system update mode; wherein the inputting mode includes at least one inputting rule, wherein the reading mode includes at least one reading rule, wherein the writing mode includes at least one writing rule, wherein the memorizing mode includes at least one memorizing rule, wherein the outputting mode includes at least one outputting rule, wherein the inquiry mode includes at least one inquiring rule, wherein the verification mode includes at least one verification rule, wherein the system update mode includes system update rules; wherein the internal control mechanism will operate the inputting mode, the reading mode, the thinking mode, the writing mode, the memorizing mode, the outputting mode, the inquiry mode, the verification mode according to the internal control rules of internal control mechanism.

3. A human-made thinking system including one or more CPU's, one or more I/O devices, and one or more memories, comprising a knowledge structure, a process structure, and an executing system; wherein the knowledge structure comprises a file organizing mechanism, and more than one element file wherein each element file individually and separately includes identifying information and knowledge information corresponding to only one element; wherein the identifying information categorizes and identifies the corresponding element, wherein the knowledge information includes knowledge about the corresponding element, wherein the knowledge is information related to at least one direct link of each element with one or more other existing elements of said knowledge structure thus connects each element to at least one other element; wherein the executing system comprises an internal control mechanism, and at least one thinking mode that, upon activation and without human intervention, establish one or more new direct links between said first existing element and at least one other existing element that has a direct link with a second existing element.

4. A human-made thinking system as claimed in claim 3, wherein the process structure further comprises at least one link process file.

5. A human-made thinking system as claimed in claim 3, further comprising a system log including at least one system log file.

6. A human-made thinking system as claimed in claim 4, wherein the executing system further comprises an inputting mode, a reading mode, a writing mode, a memorizing mode, an outputting mode, an inquiry mode, a verification mode, and a system update mode, wherein the internal control mechanism further comprises at least one internal control rule, and at least one structure rule.

7. A human-made thinking system as claimed in claim 6, wherein the inputting mode includes at least one inputting rule, wherein the reading mode includes at least one reading rule, wherein the thinking mode includes at least one thinking mode, wherein the writing mode includes at least one writing mode, wherein the memorizing mode includes at least one memorizing rule, wherein the outputting mode includes at least one outputting rule, wherein the inquiry mode includes at least one inquiry rule, wherein the verification mode includes at least one verification rule, wherein the system update mode includes at least one system update rule.

8. A knowledge structure for human-made thinking system includes one or more CPU's, one or more I/O devices, and one or more memories, wherein the human-made thinking system includes an executing system, said knowledge structure residing in one or more of said memories, comprising a file organizing mechanism, and more than one element file wherein each element file individually and separately includes identifying information and knowledge information corresponding to only one element; wherein the identifying information identifies and categorizes said corresponding element, wherein the knowledge information includes knowledge about the corresponding element, wherein the knowledge is information related to at least one direct link of each element with one or more other existing elements of said knowledge structure thus connects each element to at least one other element; wherein the executing system comprising at least one thinking rule that, upon activation, and without human intervention, establish one or more new direct links between said first existing element and at least one other existing element that has a direct link with a second existing element.

9. A knowledge structure as claimed in claim 8, wherein the identifying information includes a first identification value indicating whether the element is a word, a phrase, or a symbol, a second identification value indicating which language is the word or phrase, a third identification value indicating the type of word or phrase, a fourth identification value indicating the class of word, and fifth identification value indicating the form of the word.

10. A knowledge structure as claimed in claim 9, wherein at least one of the elements is a word.

11. A knowledge structure as claimed in claim 9, wherein at least one of the elements is a phrase.

12. A knowledge structure as claimed in claim 10, wherein at least one of the element file includes a first link information file including at least a word tree, wherein at least one of the element file includes a second link information file including at least one word of the same meaning with the element.

13. A knowledge structure as claimed in claim 10, wherein at least one of the element file includes a third link information file including at least one usage rule for the element to be used in sentences, wherein at least one of the element file includes a fourth link information file including at least one condition or occurrence that will cause the action or condition represented by the word of the element file, wherein at least one of the element file includes a fifth link information file including at least one result caused by the action represented by the word of the element file.

14. A knowledge structure as claimed in claim 10, wherein at least one of the element file includes a sixth link information file including at least one attribute of the word of the element file, wherein at least one of the element file includes a seventh link information file including at least one word or phrase that the word or phrase of the element file is the attribute of.

15. A knowledge structure as claimed in claim 10, wherein at least one of the element file includes an eighth link information file including at least one of derivative attribute of the word of the element files, wherein at least one of the element file includes a ninth link information file including at least one word or phrase that the word of the element file is the derivative attribute of.

* * * * *